United States Patent Office 3,729,491
Patented Apr. 24, 1973

3,729,491
3,5-DIOXO-A-NOR-B-HOMO STEROIDAL SPIROLACTONES
Paul D. Klimstra, Northbrook, and Charles S. Markos, Skokie, Ill., assignors to G. D. Searle & Co., Chicago, Ill.
No Drawing. Filed June 15, 1970, Ser. No. 46,546
Int. Cl. C07d 5/06
U.S. Cl. 260—343.6                   3 Claims

ABSTRACT OF THE DISCLOSURE

Irradiation of 3-keto-4β,5β-epoxy steroidal lactones with ultraviolet light affords the corresponding 3,5-dioxo-A-nor-B-homo compounds, which have valuable pharmacological properties, e.g. desoxycorticosterone acetate-inhibitory and anti-estrogenic.

---

The present invention is concerned with novel A-nor-B-homo steroidal derivatives possessing valuable pharmacological properties and, more particularly, with 3,5-dioxo-A-nor-B-homo steroidal spirolactones represented by the following structural formula

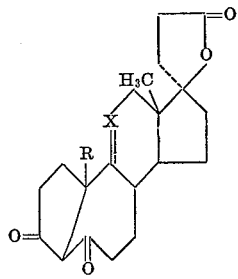

wherein R is hydrogen or a methyl radical, the dotted line indicates an optional 9(11) double bond and X is a methylene, α-hydroxymethylene or methine (—CH=) radical with the provision that X must be either a methine or α-hydroxymethylene radical when R is a methyl radical.

As disclosed hereinbefore, the instant compounds possess valuable pharmacological properties as evidenced by the ability of those compounds to inhibit the growth stimulating effect of estrogens on the uterus and also by their capacity to inhibit the sodium-retaining activity of desoxycorticosterone acetate.

The compounds of this invention are conveniently produced by irradiation with ultraviolet light of the 3-keto-4β,5β-epoxy starting materials represented by the following structural formula

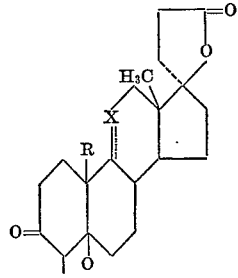

wherein R, X and the dotted line have the same definitions as hereinbefore described. Irradiation with ultraviolet light of a benzene solution containing 3-(3-oxo-4β,5β-epoxy-17β-hydroxystran - 17α-yl)propionic acid lactone to afford 3-(3,5-dioxo-17β-hydroxy-A-nor-B-homoestran-17α-yl)propionic acid lactone is a specific example of that process.

Those 4β,5β-epoxy starting materials are obtained by alkaline peroxidation of the corresponding Δ⁴ steroids. Typically, 3-(3-oxo-17β-hydroxyestr - 4-en-17α-yl)propionic acid lactone in methanol is contacted with alkaline hydrogen peroxides to afford 3-(3-oxo-4β,5β-epoxy-17β-hydroxyestran-17α-yl)propionic acid lactone.

Equivalent to the instant lactones for the purposes of this invention are the corresponding hydroxy acids and their salts as represented by the following structural formula

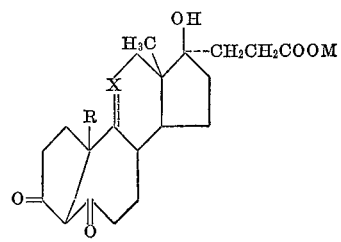

wherein R, X and the dotted line have the meanings as hereinbefore stated and M represents hydrogen, an alkali metal, alkaline earth metal or ammonium cation.

The anti-estrogenic property of the instant compounds is apparent from their activity when assayed by the procedure detailed in U.S. Pat. 3,475,420, issued Oct. 28, 1969.

Confirmation of the desoxycorticosterone acetate-inhibitory activity of the compounds of this invention is afforded by the assay described in detail in U.S. Pat. 3,422,096, issued Jan. 14, 1969.

The invention will appear more fully from the examples which follow. These examples are meant by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

To a suspension consisting of 27 parts of 3-(3-oxo-11α,17β-dihydroxyandrost-4-en-17α-yl)propionic acid lactone, 22 parts by volume of 30% aqueous hydrogen peroxide and 400 parts of methanol is added, with cooling and stirring, 6.2 parts by volume of 6 N aqueous sodium hydroxide. That reaction mixture is allowed to warm to room temperature over a period of about 3½ hours, then is diluted with a large volume of water. The resulting precipitate is collected by filtration and dried to afford 3-(3-oxo - 4β,5β - epoxy - 11α,17β - dihydroxyandrostan-17α-yl)propionic acid lactone, melting at about 177–180°.

EXAMPLE 2

A solution consisting of 25 parts of 3-(3-oxo-17β-hydroxyandrosta-4,9(11)-dien-17α-yl)propionic acid lactone, 22 parts by volume of 30% aqueous hydrogen peroxide and 400 parts of methanol is stirred and cooled at 5–10° while 6 parts by volume of 6 N aqueous sodium hydroxide is added. After completion of the addition, the reaction mixture is allowed to warm to room temperature over a period of about 3 hours, and the excess alkali is neutralized by the addition of acetic acid. A small amount of insoluble material is removed by filtration and the filtrate is diluted with a large volume of water, resulting in precipitation of the product. Collection of that product by filtration followed by drying of the filter cake affords 3-(3-oxo-4β,5β-epoxy - 17β - hydroxyandrost-9(11)-en-17α-yl)propionic acid lactone, melting at about 172–175°.

EXAMPLE 3

A mixture containing 10 parts of 3 - (3 - oxo-17β-hydroxyestr-4-en-17α-yl)propionic acid lactone, 10 parts by volume of 30% aqueous hydrogen peroxide and 200 parts of methanol is stirred and cooled at 5–10° while 2 parts of 6 N aqueous sodium hydroxide is added. The reaction mixture is then kept at 0–5° for about 16 hours and is finally neutralized by the addition of acetic acid. Dilution of that mixture with water results in separation of a granular precipitate, which is collected by filtration and washed on the filter with 1:1 aqueous methanol, thus affording 3-(3 - oxo-4β,5β-epoxy-17β-hydroxyestran-17α-yl)propionic acid lactone, melting at about 190–195°.

EXAMPLE 4

A solution consisting of 5 parts of 3-(3-oxo-4β,5β-epoxy-11α,17β - dihydroxyandrostan-17α-yl)propionic acid lactone dissolved in 440 parts of benzene is irradiated with ultraviolet light for about 12 hours, at the end of which time the solvent is removed by distillation under reduced pressure. The residual solid is dissolved in chloroform and that organic solution is extracted several times with dilute aqueous sodium hydroxide. The combined alkaline extracts are carefully acidified by the addition of hydrochloric acid and that acidic mixture is extracted with chloroform. The chloroform solution is washed with saturated aqueous sodium chloride, then dried over anhydrous sodium sulfate and stripped of solvent by distillation under reduced pressure. The resulting oily crude product is purified by recrystallization first from benzene-methylcyclohexane, then from aqueous acetone to afford 3-(3,5-dioxo-11α,17β-dihydroxy-A-nor-B-homoandrostan - 17α-yl)propionic acid lactone, melting at about 155–173° and exhibiting an optical rotation of −18° in chloroform. This compound is represented by the following structural formula

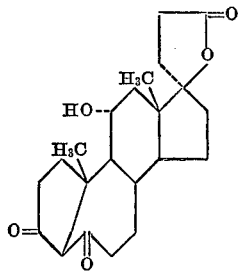

EXAMPLE 5

A solution containing 2.15 parts of 3 - (3 - oxo-4β,5β-epoxy - 17β - hydroxyandrost-9(11)-en-17α-yl)propionic acid lactone and 440 parts of benzene is irradiated with ultraviolet light for about 4 hours, then is concentrated to dryness under reduced pressure. The residual solid is dissolved in tetrahydrofuran and the resulting solution is diluted with ether. Precipitation of the crude product is effected by the addition of hexane. Purification of that precipitate is accomplished by recrystallization from aqueous methanol, thus affording 3-(3,5-dioxo-17β-hydroxy-A-nor-B-homoandrost-9(11)-en-17α-yl)propionic acid lactone, melting at about 148–162° and exhibiting an optical rotation, in chloroform, of −144°. It is represented by the following structural formula

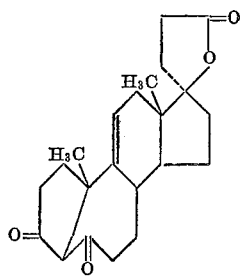

EXAMPLE 6

A solution of 5.7 parts of 3-(3-oxo-4β,5β-epoxy-17β-hydroxyestran-17α-yl)propionic acid lactone in 484 parts of benzene is irradiated with ultraviolet light for about 6¾ hours, then is filtered to remove a small amount of insoluble material. The filtrate is stripped of solvent by distillation under reduced pressure, thus affording an oily residue. Purification of that residue by recrystallization, first from ethyl acetate then from methanol, affords pure 3 - (3,5 - dioxo-17β-hydroxy-A-nor-B-homoestran-17α-yl) propionic acid lactone, which exhibits a double melting point at about 201° and 392° and also an optical rotation, in chloroform, of +25.28°. This compound is represented by the following structural formula

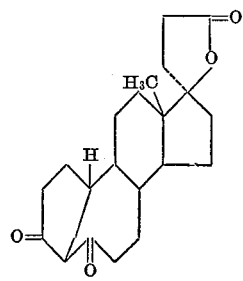

What is claimed is:
1. A compound of the formula

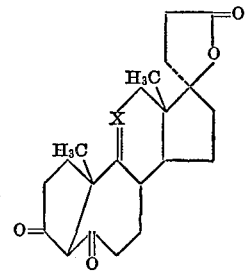

wherein the dotted line indicates an optional 9(11) double bond, X is a methine radical when the 9(11) linkage is a double bond and X is an α-hydroxymethylene radical when the 9(11) linkage is a single bond.

2. As in claim 1, the compound which is 3-(3,5-dioxo-17β - hydroxy - A - nor-B-homoandrost-9(11)-en-17α-yl) propionic acid lactone.

3. As in claim 1, the compound which is 3-(3,5-dioxo-11α,17β - dihydroxy - A - nor-B-homoandrostan-17α-yl) propionic acid lactone.

References Cited
UNITED STATES PATENTS 3,504,003  3/1970  Jeger et al. _____ 260—343.6
3,522,157  7/1970  Jeger et al. _____ 260—343.6

ALEX MAZEL, Primary Examiner

A. M. T. TIGHE, Assistant Examiner

U.S. Cl. X.R.

204—158R; 260—239.57, 514 B; 424—279